US009485401B2

(12) United States Patent
Toriumi

(10) Patent No.: US 9,485,401 B2
(45) Date of Patent: Nov. 1, 2016

(54) IMAGE PICKUP APPARATUS INCLUDING A PLURALITY OF IMAGE PICKUP UNITS FOR PHOTOGRAPHING DIFFERENT OBJECTS, METHOD OF CONTROLLING IMAGE PICKUP APPARATUS, AND STORAGE MEDIUM

(71) Applicant: CANON KABUSHIKI KAISHA, Tokyo (JP)

(72) Inventor: Hiroshi Toriumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/592,169

(22) Filed: Jan. 8, 2015

(65) Prior Publication Data

US 2015/0201116 A1    Jul. 16, 2015

(30) Foreign Application Priority Data

Jan. 14, 2014 (JP) ................................ 2014-004241

(51) Int. Cl.
*H04N 5/225* (2006.01)
*H04N 5/232* (2006.01)
*H04N 1/21* (2006.01)

(52) U.S. Cl.
CPC .......... *H04N 5/2258* (2013.01); *H04N 1/2112* (2013.01); *H04N 5/23219* (2013.01); *H04N 5/23222* (2013.01); *H04N 5/23293* (2013.01); *H04N 2201/3252* (2013.01); *H04N 2201/3276* (2013.01); *H04N 2201/3277* (2013.01)

(58) Field of Classification Search
CPC .......... H04N 5/2258; H04N 5/23293; H04N 1/2112; H04N 5/23222; H04N 2201/3276; H04N 2201/3277; H04N 2201/3252

USPC ............................................................ 348/333
See application file for complete search history.

(56) References Cited

U.S. PATENT DOCUMENTS

| 8,451,994 B2* | 5/2013 | Abuan | H04N 7/147 379/102.01 |
| 2012/0113216 A1* | 5/2012 | Seen | H04N 5/23293 348/38 |
| 2013/0285906 A1* | 10/2013 | Jeon | H04N 1/00 345/158 |
| 2014/0307101 A1* | 10/2014 | Cobb | H04N 5/45 348/169 |

FOREIGN PATENT DOCUMENTS

JP          2006-186685 A         7/2006

* cited by examiner

*Primary Examiner* — Gevell Selby
(74) *Attorney, Agent, or Firm* — Rossi, Kimms & McDowell LLP

(57) ABSTRACT

An image pickup apparatus equipped with a plurality of image pickup units for photographing different objects, which is capable sufficiently improving security and privacy protection of a photographer. The image pickup apparatus includes an out-camera and an in-camera. A CPU causes at least one of an object image photographed by the out-camera and a photographer image photographed by the in-camera to be displayed on a display section. Further, the CPU causes both the object image and the photographer image to be recorded in a recording medium in response to a photographing instruction from a user. The CPU notifies the user that a photographer image is photographed by the in-camera when although the object image is displayed on the display section, the photographer image is not displayed on the same.

16 Claims, 6 Drawing Sheets

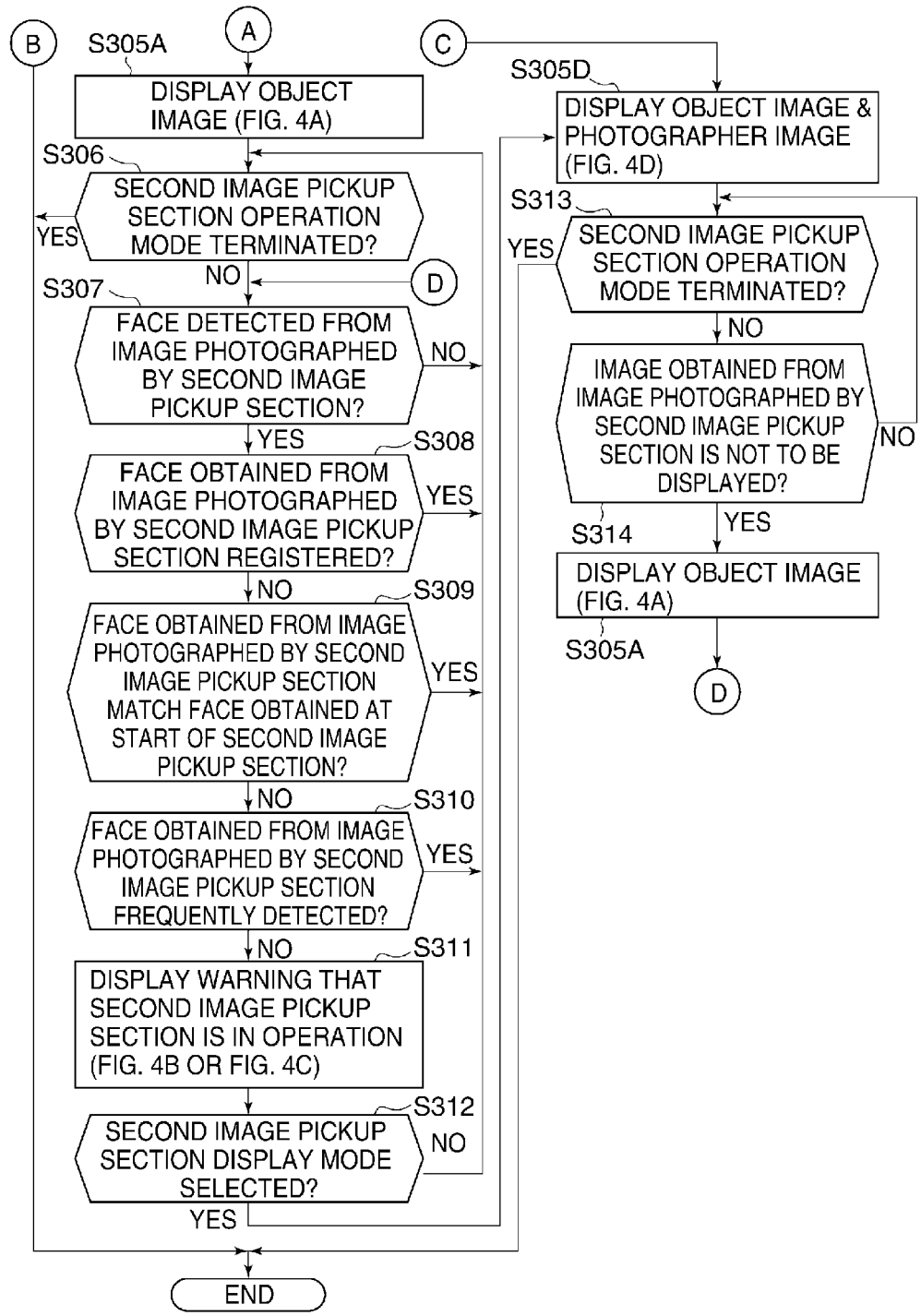

IMAGE PICKUP APPARATUS INCLUDING A PLURALITY OF IMAGE PICKUP UNITS FOR PHOTOGRAPHING DIFFERENT OBJECTS, METHOD OF CONTROLLING IMAGE PICKUP APPARATUS, AND STORAGE MEDIUM

BACKGROUND OF THE INVENTION

1. Field of the Invention

The present invention relates to an image pickup apparatus including a plurality of image pickup units for photographing different objects, a method of controlling the image pickup apparatus, and a storage medium, and more particularly to a method for enhancing security and protecting privacy when the image pickup units are operated.

2. Description of the Related Art

In general, an image pickup apparatus including a plurality of image pickup sections (image pickup units) is equipped with an image pickup section called an in-camera for photographing a photographer, and an out-camera, called as such in association with the in-camera, which is an image pickup section for photographing objects, such as landscapes or persons.

By the way, an image pickup apparatus is required to protect security and privacy of objects, such as persons, (i.e. photographed persons). To this end, for example, there has been proposed an image pickup apparatus that is equipped with a photographing inhibition unit for preventing stealthy photographing (see Japanese Patent Laid-Open Publication No. 2006-186685).

In the image pickup apparatus proposed in Japanese Patent Laid-Open Publication No. 2006-186685, when a photographer is not photographed within the angle of view of an in-camera, it is judged that the photographer has inclined the image pickup apparatus in an unnatural orientation, so that photographing by an out-camera is inhibited.

However, there are cases where the method proposed in Japanese Patent Laid-Open Publication No. 2006-186685 is insufficient from the viewpoint of protection of security and privacy. For example, in a case where an owner of an image pickup apparatus with an in-camera passes the image pickup apparatus to another person, with the in-camera put into operation, and requests the person to take a photograph of the owner (by an out-camera of the image pickup apparatus), the person is photographed by the in-camera. That is, a photograph of the person is taken by the in-camera, regardless of his will.

SUMMARY OF THE INVENTION

The present invention provides an image pickup apparatus equipped with a plurality of image pickup units for photographing different objects, which is capable of sufficiently improving security and privacy protection of a photographer, a method of controlling the image pickup apparatus, and a storage medium.

In a first aspect of the present invention, there is provided an image pickup apparatus comprising a first image pickup unit, a second image pickup unit different from the first image pickup unit, a display control unit configured to control at least one of a first live image photographed by the first image pickup unit and a second live image photographed by the second image pickup unit to be displayed on a display section, a recording control unit configured to control both an image photographed by the first image pickup unit and an image photographed by the second image pickup unit to be recorded in a recording medium, in response to a photographing instruction from a user, and a notification unit configured to notify the user that an image is photographed by the second image pickup unit, in a case where although the first live image is displayed on the display section, the second live image is not displayed on the display section.

In a second aspect of the present invention, there is provided a method of controlling an image pickup apparatus including a first image pickup unit, and a second image pickup unit different from the first image pickup unit, comprising controlling at least one of a first live image photographed by the first image pickup unit and a second live image photographed by the second image pickup unit to be displayed on a display section, controlling both an image photographed by the first image pickup unit and an image photographed by the second image pickup unit to be recorded in a recording medium, in response to a photographing instruction from a user, and notifying the user that an image is photographed by the second image pickup unit, in a case where although the first live image is displayed on the display section, the second live image is not displayed on the display section.

In a third aspect of the present invention, there is provided a non-transitory computer-readable storage medium storing a computer-executable program for executing a method of controlling an image pickup apparatus including a first image pickup unit, and a second image pickup unit different from the first image pickup unit, wherein the method comprises controlling at least one of a first live image photographed by the first image pickup unit and a second live image photographed by the second image pickup unit to be displayed on a display section, controlling both an image photographed by the first image pickup unit and an image photographed by the second image pickup unit to be recorded in a recording medium, in response to a photographing instruction from a user, and notifying the user that an image is photographed by the second image pickup unit, in a case where although the first live image is displayed on the display section, the second live image is not displayed on the display section.

According to the present invention, the image pickup apparatus is configured such that even when photographing is performed using a second image pickup unit without displaying a second image on a display section, it is warned that the second image pickup unit is in operation. This makes it possible to make a photographer aware that photographing of the photographer is being performed, whereby it is possible to prevent photographing from being performed without permission of the photographer, and improve security and privacy protection.

Further features of the present invention will become apparent from the following description of exemplary embodiments (with reference to the attached drawings).

BRIEF DESCRIPTION OF THE DRAWINGS

FIGS. 3A and 3B are a flowchart of a warning display process performed by the digital camera shown in FIG. 1.

DESCRIPTION OF THE EMBODIMENTS

The present invention will now be described in detail below with reference to the accompanying drawings showing embodiments thereof.

Figure 1:
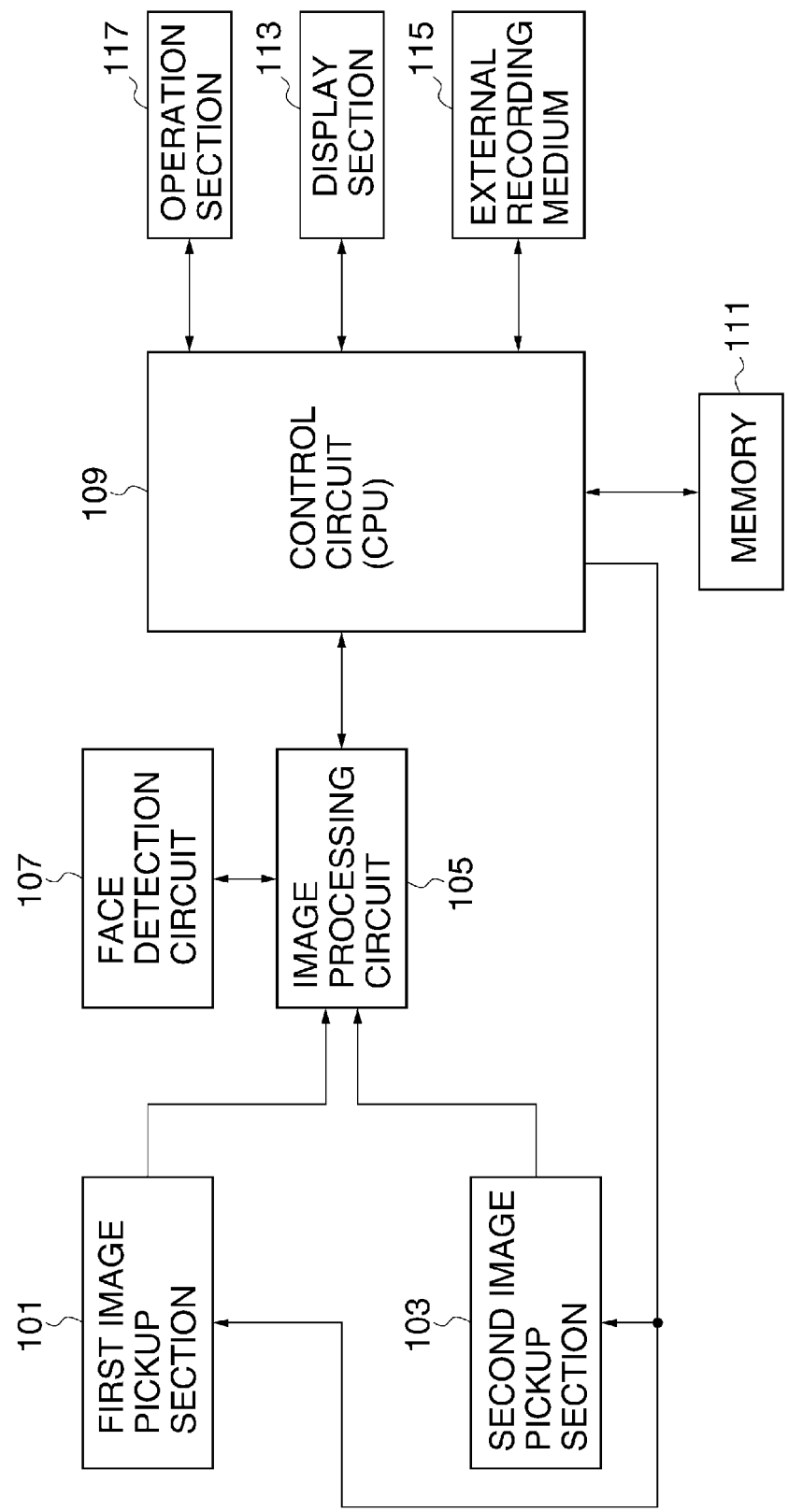
FIG. 1 is a block diagram of a digital camera which is an image pickup apparatus according to an embodiment of the present invention.

FIG. 1 is a block diagram of an image pickup apparatus according to an embodiment of the present invention.

The image pickup apparatus shown in FIG. 1 is, for example, a digital camera (hereinafter simply referred to as "the camera"), and includes a first image pickup section 101, and a second image pickup section 103. The first image pickup section 101 photographs an object, such as a person (i.e. photographed person), and the second image pickup section 103 photographs a photographer himself/herself.

The first image pickup section 101 generates an analog signal according to an object, and performs analog-to-digital conversion on the analog signal to deliver a digital signal as an object image signal. On the other hand, the second image pickup section 103 generates an analog signal according to an photographer, and performs analog-to-digital conversion on the analog signal to deliver a digital signal as a photographer image signal.

The above-mentioned object image signal and photographer image signal are given to an image processing circuit 105. The image processing circuit 105 performs signal processing and development processing on the object image signal and the photographer image signal, and thereby generates object image data (also referred to as "first live image data") and photographer image data (also referred to as "second live image data") to store them in a memory 111. The image processing circuit 105 is capable of simultaneously processing the two input image signals.

A face detection circuit 107 receives the object image data and the photographer image data, and detects a face area of the objet existing in the object image data, to thereby obtain an object face area. Similarly, the face detection circuit 107 detects a face area of the objet existing in the photographer image data, and thereby obtains a photographer face area.

A control circuit (CPU) 109 controls the overall operation of the camera. The CPU 109 records, in the memory 111, object face information indicative of the object face area and photographer face information indicative of the photographer face area, detected by in the face detection circuit 107. Further, in the memory 111, persons are registered by a user recording various face information in advance, and various setting information of the camera are stored.

In response to an operation of the user on a photographing button, not shown, of the operation section 117 by the user, the CPU 109 causes the image processing circuit 105 to perform processing for recording (compression and the like) on the object image data and the photographer image data stored in the memory 111, and causes the processed object image data and photographer image data to be recorded in an external storage medium 115. In recording the photographer image data, it may be recorded as a separate image file from an image file of the object image data, or may be recorded by synthesizing the same with the object image data by so-called picture-in-picture synthesis such that the photographer image data is incorporated in the object image data. The CPU 109 displays an object image (also referred to as "a first live image") and a photographer image (also referred to as "a second live image") on a display section 113 according to the object image data and the photographer image data, respectively. Further, when reproducing an image, the CPU 109 reads out the object image data or the photographer image data recorded e.g. in the external recording medium 115, and displays the read image data as an image on the display section 113.

An operation section 117 is connected to the CPU 109. By using the operation section 117, the user (or the photographer) sends various commands (including a photographing instruction) to the CPU 109, and configures settings of photographing (including a setting of whether or not to operate the second image pickup section 103).

Note that as described hereinafter, the operation section 117 is equipped with an operation button (not shown) for selecting whether or not to display an image obtained by the second image pickup section 103 (i.e. the photographer image data) on the display section 113.

Further, when the second image pickup section 103 is performing a photographing operation, the CPU 109 displays e.g. characters or a mark indicating that the second image pickup section 103 is in operation, on the display section 113. In the present embodiment, instead of displaying e.g. a tally light, the CPU 109 displays characters or a mark indicating that the second image pickup section 103 is in operation, on the display section 113, to thereby positively notify the photographer of the fact that the second image pickup section 103 is in operation. That is, when the photographer image is not displayed on the display section 113, the CPU 109 gives a warning to the photographer by displaying information indicating that the in-camera (second image pickup unit) is photographing an image (is in operation), in a display form different from a display form used when the photographer image is displayed on the display section 113.

Figure 2A:
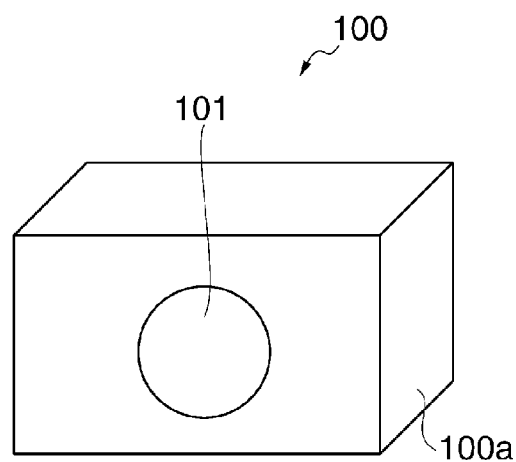
FIG. 2A is a schematic view of the appearance of the digital camera shown in FIG. 1, as viewed from the front.
Figure 2B:
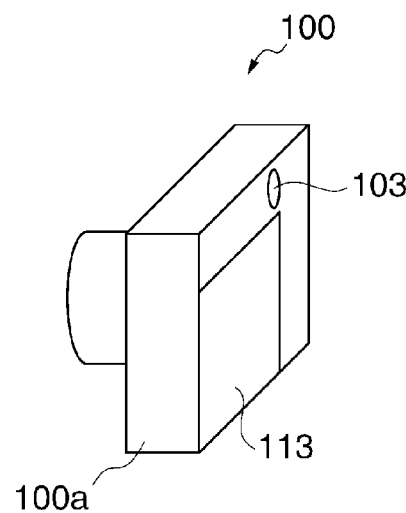
FIG. 2B is a schematic view of the appearance of the digital camera, as viewed from a side.
Figure 2C:
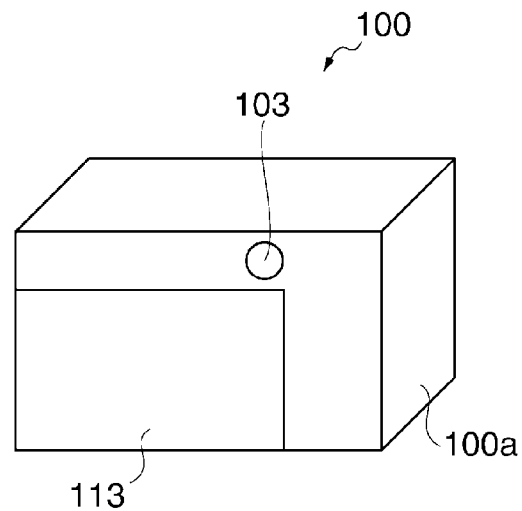
FIG. 2C is a schematic view of the appearance of the digital camera, as viewed from the rear.

FIGS. 2A to 2C are views useful in explaining the appearance of the camera shown in FIG. 1, in which FIG. 2A is a view of the camera, as viewed from the front, FIG. 2B is a view of the camera, as viewed from a side, and FIG. 2C is a view of the camera, as viewed from the rear.

Referring to FIGS. 2A to 2C, the first image pickup section 101 is disposed at a central portion of a housing 100a of the camera 100 on the front side thereof, and the display section 113 is disposed on the rear side of the housing 100a. Further, the second image pickup section 103 is disposed above the display section 113 on the rear side of the housing 100a. Note that in FIGS. 2A to 2C, the operation section 117 is omitted.

In the illustrated examples, as described hereinafter, when the photographer is positioned on the rear side of the camera 100 and also the second image pickup section 103 is in operation, the CPU 109 displays a warning (mark or the like) indicating that the second image pickup section 103 is in operation, on the display section 113.

In the following description, the first image pickup section 101 is referred to as "the out-camera", and the second image pickup section 103 is referred to as "the in-camera", for convenience of explanation.

Figure 3A:
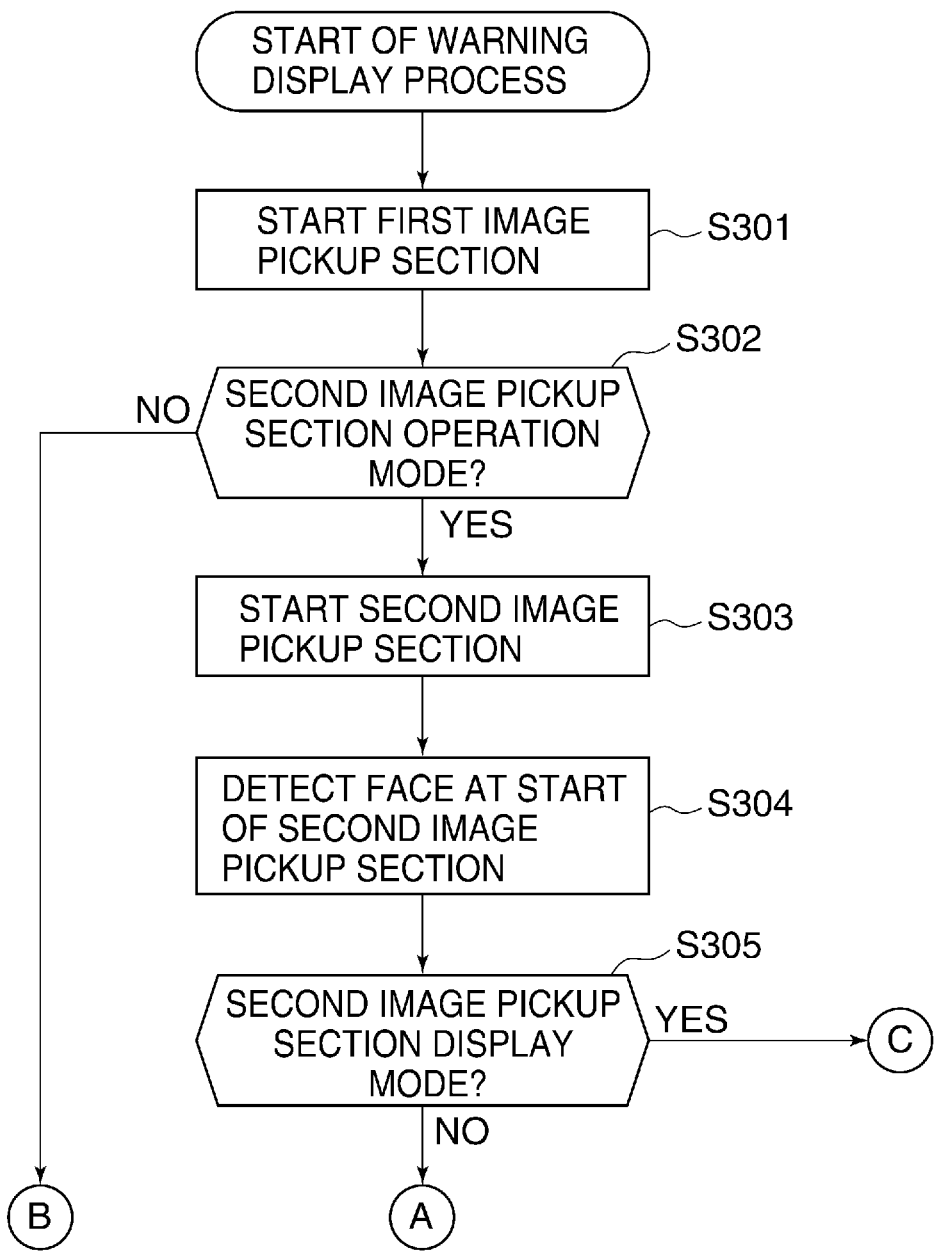

FIGS. 3A and 3B are a flowchart of a warning display process performed by the camera shown in FIG. 1. Note that the warning display process is performed under the control of the CPU 109.

When the photographer turns on a power button, not shown, provided on the operation section 117, the CPU 109 starts the out-camera 101 (step S301). This makes it possible for the photographer to photograph an object, such as a person, using the out-camera 101. More specifically, an object image signal is obtained by an analog signal from the out-camera (first image pickup section) 101, and the image signal processing circuit 105 performs signal processing and development processing on the object image signal to create object image data.

Figure 4A:
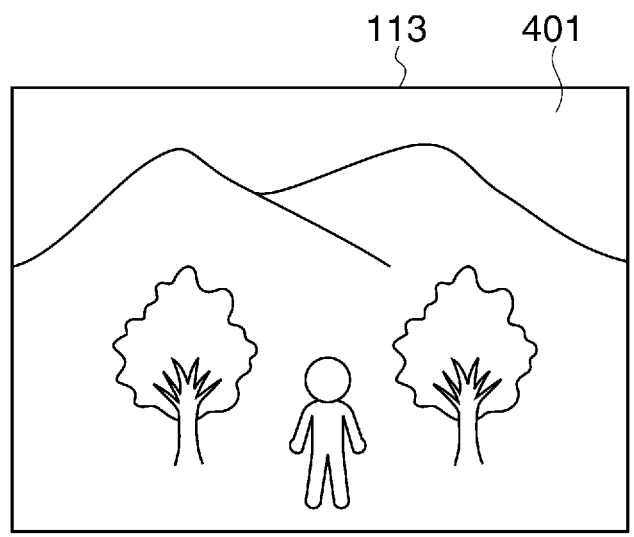
FIG. 4A is a view showing a screen displaying only an object image, which is useful in explanation of the display of a warning in the warning display process.

The CPU 109 determines whether or not a second image pickup section operation mode for operating the in-camera 103 is selected via the operation section 117 (step S302). If the second image pickup section operation mode is not selected (NO to the step S302), the CPU 109 terminates the warning display process. Note that when terminating the warning display process, the CPU 109 terminates the operation of the in-camera (second image pickup section) 103, and then switches to a mode of normal photographing in which the out-camera (first image pickup section) 101 performs photographing of an object, and only an object image is displayed on the display section 113 as shown in FIG. 4A. Further, during normal photographing, if the user performs an operation for switching the mode to the second image pickup section operation mode, the CPU 109 starts the warning display process again.

On the other hand, if the second image pickup section operation mode is selected (YES to the step S302), the CPU 109 starts the in-camera 103 (step S303). When the in-camera 103 is started, the CPU 109 performs processing for causing the analog signal output from the in-camera 103 to be converted to the photographer image signal, and causing the image signal processing circuit 105 to perform signal processing and development processing on the photographer image signal to create photographer image data (second image data). After the in-camera 103 is started, the face detection circuit 107 receives the second image data from the image processing circuit 105 or the memory 111, and detects a face area from the second image data, under the control of the CPU 109. That is, the face detection circuit 107 detects a face area obtained when the in-camera (second image pickup section) 103 has been started (step S304). The CPU 109 records the face area detected by the face detection circuit 107 via the image processing circuit 105 in the memory 111 as photographer face information.

Then, the CPU 109 determines whether or not a mode for displaying the image obtained by the in-camera 103 (i.e. the second image data) on the display section 113 (second image pickup section display mode) is selected (step S305).

Note that the second image pickup section display mode is set via the operation section 117 or is set in advance in the memory 111.

Figure 4B:
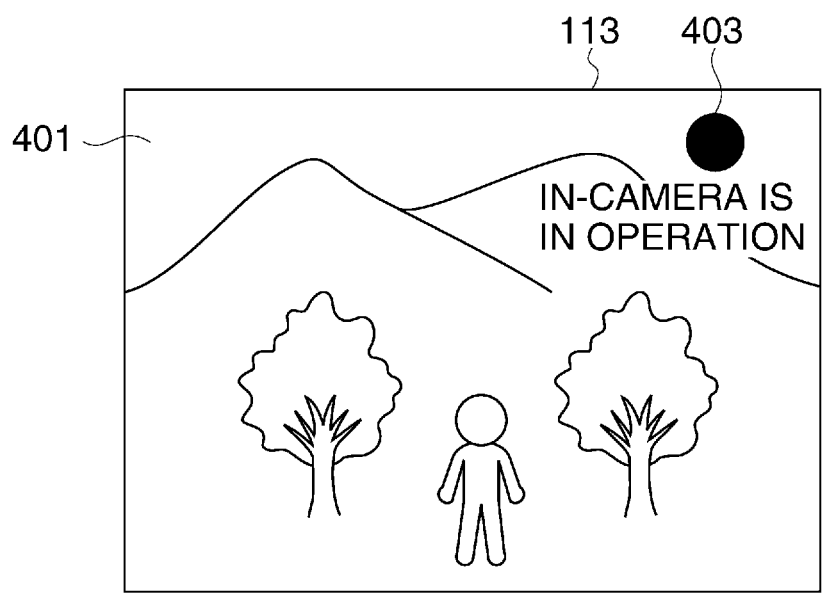
FIG. 4B is a view illustrating, for the sake of the explanation, a warning display on the screen displaying the object image, including a warning indicating that an in-camera is in operation.
Figure 4C:
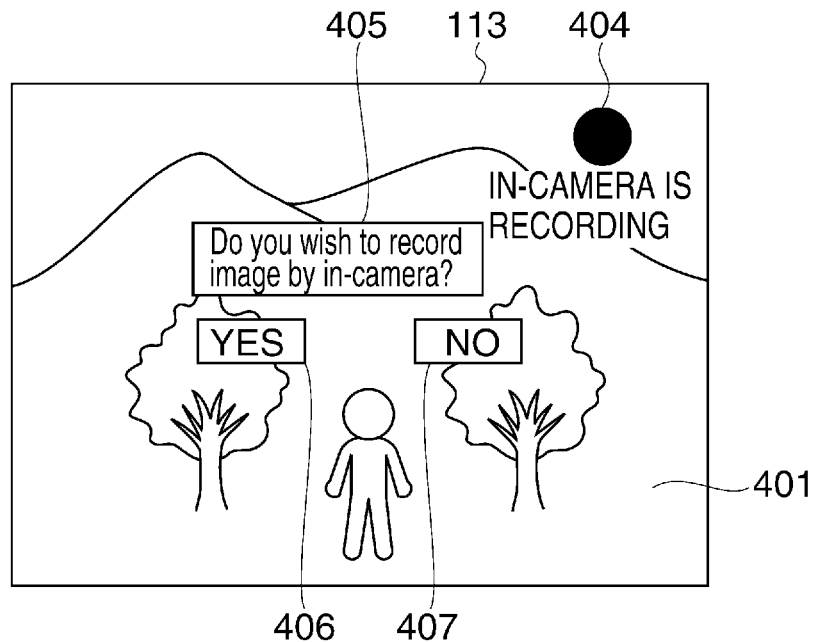
FIG. 4C is a view illustrating, for the sake of the explanation, a warning display on the screen displaying the object image, including a warning indicating that the in-camera is recording an image.
Figure 4D:
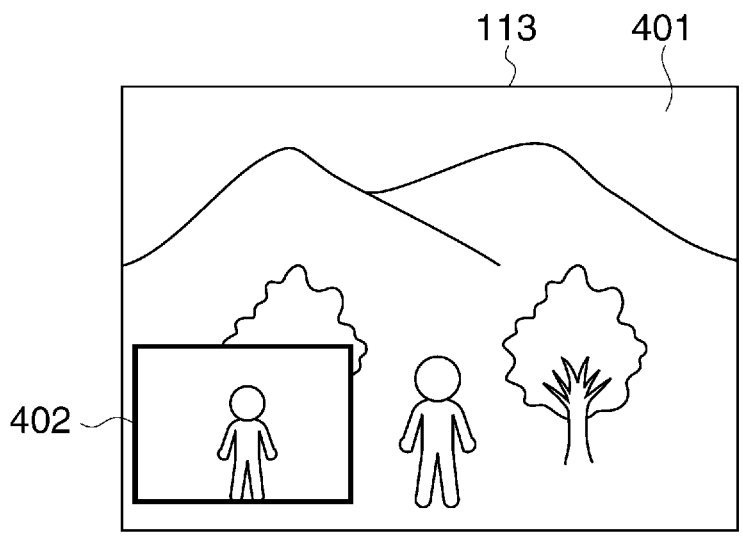
FIG. 4D is a view showing, for the sake of the explanation, a screen on which the object image and a photographer image are displayed.

FIGS. 4A to 4D are diagrams useful in explaining displays of warnings in the warning display process shown in FIGS. 3A and 3B, in which FIG. 4A shows a screen displaying only an object image, FIG. 4B is a view illustrating a warning display on the screen displaying the object image, including a warning indicating that the in-camera is in operation. FIG. 4C is a view illustrating a warning display on the screen displaying the object image, including a warning indicating that the in-camera is recording an image. FIG. 4D is a view showing a screen on which the object image and a photographer image are displayed.

If the second image pickup section display mode is not selected (NO to the step S305), the CPU 109 displays an object image 401 shown in FIG. 4A on the display section 113 (step S305A). Then, the CPU 109 determines whether or not an operation for terminating the second image pickup section operation mode has been performed via the operation section 117 (step S306). If the operation for terminating the second image pickup section operation mode has been performed (YES to the step S306), the CPU 109 terminates the warning display process, and switches the mode to the mode of normal photographing.

If the operation for terminating the second image pickup section operation mode has not been performed (NO to the step S306), the face detection circuit 107 detects a face area from the image obtained by the in-camera 103 (i.e. the second image data) again, under the control of the CPU 109. Then, the CPU 109 determines whether or not a face area has been detected from the second image data (step S307).

If no face area has been detected from the second image data (NO to the step S307), the CPU 109 returns to the step S306, whereas if a face area has been detected from the second image data (YES to the step S307), the CPU 109 determines whether or not photographer face information indicative of the detected face area matches any photographer face information registered in the memory 111, to thereby determine whether or not the photographer indicated by the photographer face information is a person registered in advance in the memory 111 (step S308).

If the photographer is registered in advance in the memory 111 (YES to the step S308), the CPU 109 regards the photographer as a person who has permitted photographing by the in-camera 103, and returns to the step S306.

On the other hand, if the photographer is not registered in advance in the memory 111 (NO to the step S308), the CPU 109 compares the photographer face information obtained in the step S307 and the photographer face information obtained in the step S304, and determines whether or not the two information items indicate the same face (step S309).

If the two information items indicate the same face (YES to the step S309), the CPU 109 regards the photographer as a person who has started the in-camera 103 (i.e. the person who has permitted the photographing), and returns to the step S306. If the two information items do not indicate the same face (NO to the step S309), i.e. if they do not match, the CPU 109 regards the photographer as a person who is not aware of the start of the in-camera 103, and determines whether or not the frequency of detection of the face area obtained in the step S307 is high (step S310).

In the step S310, e.g. if the detection frequency of the face area detected in the step S307 is not lower than a predetermined frequency, the CPU 109 determines that the detection frequency of the face area is high.

If the detection frequency of the face area is high (YES to the step S310), the CPU 109 regards the photographer as the person who has permitted the photographing by the in-camera 103, and returns to the step S306. On the other hand, if the detection frequency of the face area is not high, i.e. if the detection frequency of the face area is lower than the predetermined frequency (NO to the step S310), a warning indicating that the in-camera 103 is in operation is displayed on the display section 113 (step S311).

In the step S311, the CPU 109 displays the screen shown in FIG. 4B or 4C on the display section 113. According to a flow of processing operations (steps) described heretofore, since the in-camera 103 is in operation, an image of the second live image data can be displayed, but since the second image pickup section display mode is not selected, the image of the second live image data is not displayed, that is, the CPU 109 displays the screen shown in FIG. 4B on the display section 113.

In FIG. 4B, a message "in-camera is in operation" and a mark 403 indicating that the in-camera is in operation are displayed on an upper right portion of the display section 113. Here, as mentioned above, since the second image pickup section display mode is not selected, the object image 401 obtained through photographing by the out-camera 101 is displayed on the screen, but the photographer image obtained through photographing by the in-camera 103 is not displayed.

In a case where the user has set the in-camera image-recording mode via the operation section 117 and the image (second image data) obtained through photographing by the in-camera 103 is to be recorded in the external recording medium 115, the CPU 109 performs warning display indicating that an image photographed by the in-camera 103 is to be recorded, as shown in FIG. 4C. In FIG. 4C, a message "in-camera is recording" and a mark 404 indicating that the image obtained by the in-camera 103 is being recorded, are displayed on the upper right portion of the display section 113.

When performing the warning display as shown in FIG. 4C, the CPU 109 may display a message 405 "Do you wish to record image by in-camera?", as well as a "YES" button 406 and a "NO" button 407. That is, on the display section 113, the CPU 109 displays a confirmation screen for requesting the photographer to select whether or not to permit the second image data to be recorded in the external recording medium 115.

When the photographer selects the "YES" button 406 on the confirmation screen, the CPU 109 records the second image data stored in the memory 111, in the external recording medium 115. On the other hand, the photographer selects the "NO" button 407, the CPU 109 discards the second image data without recording the second image data stored in the memory 111, in the external recording medium 115. Alternatively, in a case where the second image data has already been recorded in the external recording medium 115, the second image data may be deleted from the external recording medium 115 according to selection of the "NO" button 407. Further, when the object image photographed by the out-camera 101 and the photographer image photographed by the in-camera 103 are set to be recorded after being synthesized, if the "NO" button 407 is selected on the screen shown in FIG. 4C, it is only required to record the object image alone in the external recording medium without synthesizing the photographer image therewith.

Note that here, since it is determined in the step S305, as mentioned hereinabove, that the second image pickup section display mode is not selected, the object image 401 obtained through photographing by the out-camera 101 is displayed on the screen, but the photographer image is not displayed on the same.

Then, the CPU 109 determines again whether or not the second image pickup section display mode is selected (step S312). If the second image pickup section display mode is not selected (NO to the step S312), the CPU 109 returns to the step S306. On the other hand, if the second image pickup section display mode is selected (YES to the step S312), the process proceeds to a step S305D, described below.

If it is determined in the step S305 that the second image pickup section display mode is selected (YES to the step S305), the CPU 109 displays the screen shown in FIG. 4D on the display section 113 (step S305D). In FIG. 4D, the object image 401 is displayed on the display section 113, and the photographer image, denoted by reference numeral 402, is displayed on a lower left portion of the screen. The CPU 109 judges that this has made the photographer aware that the in-camera 103 is in operation, and then determines whether or not the operation for terminating the second image pickup section operation mode has been performed (step S313). If the operation for terminating the second image pickup section operation mode has been performed (YES to the step S313), the CPU 109 terminates displaying the photographer image, and terminates the warning display process.

On the other hand, if the operation for terminating the second image pickup section operation mode has not been performed (NO to the step S313), the CPU 109 continues to displays the screen shown in FIG. 4D on the display section 113.

Note that when the photographer image 402 is displayed on the display section 113, the CPU 109 does not display the mark 403 appearing in FIG. 4B, which indicates that the in-camera is in operation or the mark 404 appearing in FIG. 4C, which indicates that the image obtained by the in-camera 103 is being recorded. However, if the display of the mark is set in advance, for example, the CPU 109 displays the mark 403 or the mark 404.

Then, the CPU 109 determines whether or not the photographer has selected via the operation section 117 that the photographer image is not to be displayed (step S314). If the photographer has selected that the photographer image is not to be displayed (YES to the step S314), the CPU 109 displays the screen shown in FIG. 4A (i.e. the object image) on the display section 113 (step S304A), and the process proceeds or returns to the step S307.

On the other hand, if the photographer has not selected that the photographer image is not to be displayed (NO to the step S314), the CPU 109 returns to the step S313.

Note that when the user, such as the photographer, operates the operation section 117 to thereby inhibit the photographer image 402 from being displayed, the mark 403 or 404 appearing in FIG. 4B or 4C is inhibited from being displayed, since it is not absolutely necessary to display the mark 403 or 404 for security. However, the mark 403 or 404 may be displayed.

As described heretofore, in the embodiment of the present invention, in a case where a photographer image photographed by the in-camera is not displayed on the display section, a warning that photographing of the photographer using the in-camera is being performed is displayed for the photographer, such as the user, if there are satisfied the following conditions: the face of the photographer is not registered in advance (first condition), the face of the photographer does not match a face obtained at the start of the camera (second condition), and the frequency of detection of the face during operation of the in-camera is low (third condition).

This makes it possible to prevent the user from being photographed without user's permission, so that it is possible to strengthen security and privacy protection.

Further, in the embodiment of the present invention, when a warning is to be displayed, a message and a mark indicating that the in-camera is in operation (or an image obtained thereby is being recorded) are displayed, so that it is possible for the user (i.e. the photographer) to positively know that the in-camera is in operation.

As is apparent from the above description, in the example shown in FIG. 1, the CPU 109 functions as a display control unit, and the image processing circuit 105, the face detection circuit 107, and the CPU 109 function as a notification unit. Further, the face detection circuit 107 functions as a detection unit.

Other Embodiments

Embodiment(s) of the present invention can also be realized by a computer of a system or apparatus that reads out and executes computer executable instructions (e.g., one or more programs) recorded in a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-004241 filed Jan. 14, 2014 which is hereby incorporated by reference herein in its entirety.

What is claimed is:

1. An image pickup apparatus comprising:
a first image pickup unit;
a second image pickup unit different from said first image pickup unit;
a display control unit configured to control at least one of a first live image photographed by said first image pickup unit and a second live image photographed by said second image pickup unit to be displayed on a display section;
a recording control unit configured to control both an image photographed by said first image pickup unit and an image photographed by said second image pickup unit to be recorded in a recording medium, in response to a photographing instruction from a user; and
a notification unit configured to notify the user that an image is photographed by said second image pickup unit, in a case where although the first live image is displayed on the display section, the second live image is not displayed on the display section.

2. The image pickup apparatus according to claim 1, wherein said recording control unit is configured to control the image photographed by said second image pickup unit to be recorded in the recording medium, irrespective of whether or not the second live image is displayed on the display section.

3. The image pickup apparatus according to claim 1, wherein said notification unit is configured to notify the user that photographing processing is being performed by said second image pickup unit.

4. The image pickup apparatus according to claim 1, wherein said notification unit is configured to notify the user that the image photographed by said second image pickup unit is to be recorded in the recording medium according to the photographing instruction.

5. The image pickup apparatus according to claim 1, wherein said notification unit is configured to display information indicating that an image is photographed by said second image pickup unit on the display section.

6. The image pickup apparatus according to claim 5, wherein in a case where the second live image is displayed on the display section, said notification unit is configured to not display the information on the display section.

7. The image pickup apparatus according to claim 1, wherein when the second live image is not displayed on the display section, said notification unit is configured to display information indicating that an image is photographed by said second image pickup unit on the display section, in a display form different from a display form used when the second image is displayed.

8. The image pickup apparatus according to claim 1, wherein in a case where the second live image is not displayed on the display section, said notification unit is configured to display information indicating that an image photographed by said second image pickup unit is to be recorded in the recording medium according to the photographing instruction from the user.

9. The image pickup apparatus according to claim 1, wherein in a case where the second live image is not displayed on the display section, and also satisfies predetermined conditions, said notification unit is configured to notify the user that an image is photographed by said second image pickup unit.

10. The image pickup apparatus according to claim 9, further comprising a detection unit configured to detect a photographer from an image photographed by said second image pickup unit, and
wherein in a case where the second live image is not displayed on the display section, and the photographer detected by said detection unit satisfies predetermined conditions, said notification unit is configured to notify the user that an image of the photographer is photographed by said second image pickup unit.

11. The image pickup apparatus according to claim 10, further comprising a storage unit configured to register a person by storing information of the person,
wherein in a case where the photographer detected by said detection unit is the person registered in said storage unit, said notification unit is configured to not notify the user that an image of the photographer is photographed by said second image pickup unit.

12. The image pickup apparatus according to claim 1, further comprising a selection unit configured to select whether or not to display the second live image on the display section, and
wherein in a case where said selection unit selects that the second live image is not to be displayed on the display section, said display control unit is configured to control the second live image not to be displayed on the display section.

13. The image pickup apparatus according to claim 1, further comprising a selection screen display unit configured to display a selection screen for selecting whether or not to record the image photographed by said second image pickup unit in the recording medium.

14. The image pickup apparatus of claim 1 wherein the notification unit is configured to notify the user that an image is photographed by said second image pickup unit, in a case where the user, visible in the second live image, is not registered in the image pickup apparatus.

15. A method of controlling an image pickup apparatus including a first image pickup unit, and a second image pickup unit different from said first image pickup unit, comprising:
    controlling at least one of a first live image photographed by the first image pickup unit and a second live image photographed by the second image pickup unit to be displayed on a display section;
    controlling both an image photographed by the first image pickup unit and an image photographed by the second image pickup unit to be recorded in a recording medium, in response to a photographing instruction from a user; and
    notifying the user that an image is photographed by the second image pickup unit, in a case where although the first live image is displayed on the display section, the second live image is not displayed on the display section.

16. A non-transitory computer-readable storage medium storing a computer-executable program for executing a method of controlling an image pickup apparatus including a first image pickup unit, and a second image pickup unit different from said first image pickup unit,
    wherein the method comprises:
    controlling at least one of a first live image photographed by the first image pickup unit and a second live image photographed by the second image pickup unit to be displayed on a display section;
    controlling both an image photographed by the first image pickup unit and an image photographed by the second image pickup unit to be recorded in a recording medium, in response to a photographing instruction from a user; and
    notifying the user that an image is photographed by the second image pickup unit, in a case where although the first live image is displayed on the display section, the second live image is not displayed on the display section.

* * * * *